(12) United States Patent
Kesselman (10) Patent No.: US 8,594,050 B2
(45) Date of Patent: Nov. 26, 2013

(54) TECHNIQUES TO CONTROL WIRELESS PERSONAL AREA NETWORKS

(75) Inventor: Alex Kesselman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1426 days.

(21) Appl. No.: 11/966,054

(22) Filed: Dec. 28, 2007

(65) Prior Publication Data

US 2009/0168650 A1 Jul. 2, 2009

(51) Int. Cl.
*H04W 4/00* (2009.01)

(52) U.S. Cl.
USPC ......... 370/334; 455/553.1; 455/15; 455/11.1; 455/41.2; 370/338; 370/339; 370/327; 375/267; 375/299; 375/347

(58) Field of Classification Search
USPC ........................................................ 370/334
See application file for complete search history.

(56) References Cited

U.S. PATENT DOCUMENTS

| | | | |
|---|---|---|---|
| 6,980,522 B2 * | 12/2005 | Boyle | 370/252 |
| 7,167,722 B2 * | 1/2007 | Chiu et al. | 455/553.1 |
| 2002/0065083 A1 | 5/2002 | Patel | |
| 2003/0086404 A1 * | 5/2003 | Beckmann et al. | 370/338 |
| 2003/0152054 A1 * | 8/2003 | Hirano et al. | 370/338 |
| 2004/0258033 A1 * | 12/2004 | Heinonen et al. | 370/338 |
| 2006/0067263 A1 | 3/2006 | Li et al. | |
| 2006/0262759 A1 * | 11/2006 | Bahl et al. | 370/338 |
| 2007/0076672 A1 * | 4/2007 | Gautier et al. | 370/338 |
| 2007/0099668 A1 | 5/2007 | Sadri et al. | |
| 2008/0101598 A1 * | 5/2008 | Dillaway | 380/44 |
| 2010/0074097 A1 * | 3/2010 | Jeon et al. | 370/217 |

FOREIGN PATENT DOCUMENTS

| | | |
|---|---|---|
| JP | 2004128616 A | 4/2004 |
| JP | 2007013760 | 1/2007 |
| JP | 07166094 A2 | 6/2007 |
| JP | 2007251655 A | 9/2007 |
| KR | 20030004389 A | 1/2003 |
| KR | 1020070029927 A | 3/2007 |
| WO | 0291683 A1 | 11/2002 |
| WO | 2007106042 A1 | 9/2007 |
| WO | 2009085527 A1 | 7/2009 |

OTHER PUBLICATIONS

PCT/US2008/085106, "International Search Report/Written Opinion received for PCT Patent Application No. PCT/US2008/085106 mailed on Apr. 30, 2009", 10 Pages.

* cited by examiner

*Primary Examiner* — Ian N Moore
*Assistant Examiner* — Dung B Huynh
(74) *Attorney, Agent, or Firm* — Kacvinsky Daisak PLLC (57) ABSTRACT

Techniques to control wireless personal area networks are described. An apparatus may include a radio coordinator module operative to receive a transmit data flow having media information and control information, and switch the media information to a media flow path and the control information to a control flow path, a first transceiver to couple to the radio coordinator module, the first transceiver operative to transmit the media information from the media flow path to a receiver using a first frequency band allocated for a wireless personal area network, and a second transceiver to couple to the radio coordinator module, the second transceiver operative to transmit the control information from the control flow path to the receiver using a second frequency band allocated for a wireless local area network. Other embodiments are described and claimed.

22 Claims, 8 Drawing Sheets

RECEIVE A TRANSMIT DATA FLOW HAVING MEDIA
INFORMATION AND CONTROL INFORMATION
402

SWITCH THE MEDIA INFORMATION TO A MEDIA FLOW
PATH AND THE CONTROL INFORMATION TO A CONTROL
FLOW PATH
404

TRANSMIT THE MEDIA INFORMATION FROM THE MEDIA
FLOW PATH TO A RECEIVER USING A FIRST FREQUENCY
BAND ALLOCATED FOR A WIRELESS PERSONAL AREA
NETWORK, AND THE CONTROL INFORMATION FROM THE
CONTROL FLOW PATH TO THE RECEIVER USING A
SECOND FREQUENCY BAND ALLOCATED FOR A
WIRELESS LOCAL AREA NETWORK
406

TECHNIQUES TO CONTROL WIRELESS PERSONAL AREA NETWORKS

BACKGROUND

A Wireless Personal Area Network (WPAN) is used to convey information over relatively short distances among relatively few participants. Depending on the availability of radio-frequency (RF) spectrum, a WPAN device may potentially engage in higher-speed communications on the order of multi-Gigabit transmissions. Such higher-speed communications are typically implemented using directional antenna patterns to reduce path loss and conserve power. Directional antenna patterns, however, may limit the number of devices that can receive such transmissions. Omni-directional antenna patterns are an option to reach more devices, although power requirements and overhead may be substantially increased. As a result, device communication capabilities for current WPAN devices are limited. Such limitations may impair or even prevent some WPAN devices from performing various communications applications.

DETAILED DESCRIPTION

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to wireless communications systems. Some embodiments may be particularly directed to a wireless communications system having multiple wireless devices each arranged to perform dual-band radio operations using multiple co-located radios. In one embodiment, a first radio module may be used to transmit media information over a first frequency band to one or more receiving devices, and a second radio module may be used to transmit control information over a second frequency band to the same receiving devices. For example, the first radio module may comprise a wireless personal area network (WPAN) radio module arranged to communicate over a WPAN frequency band, and the second radio module may comprise a wireless local area network (WLAN) radio module arranged to communicate over a WLAN frequency band. A radio coordinator module may coordinate and synchronize operations between the radio modules. As a result, the higher speed capabilities of the WPAN radio module may be utilized to communicate bandwidth consuming media information to one or more receiving devices, while the omni-directional coverage capabilities of the WLAN radio module may be utilized to communicate out-of-band control information for the one or more receiving devices.

Figure 1:
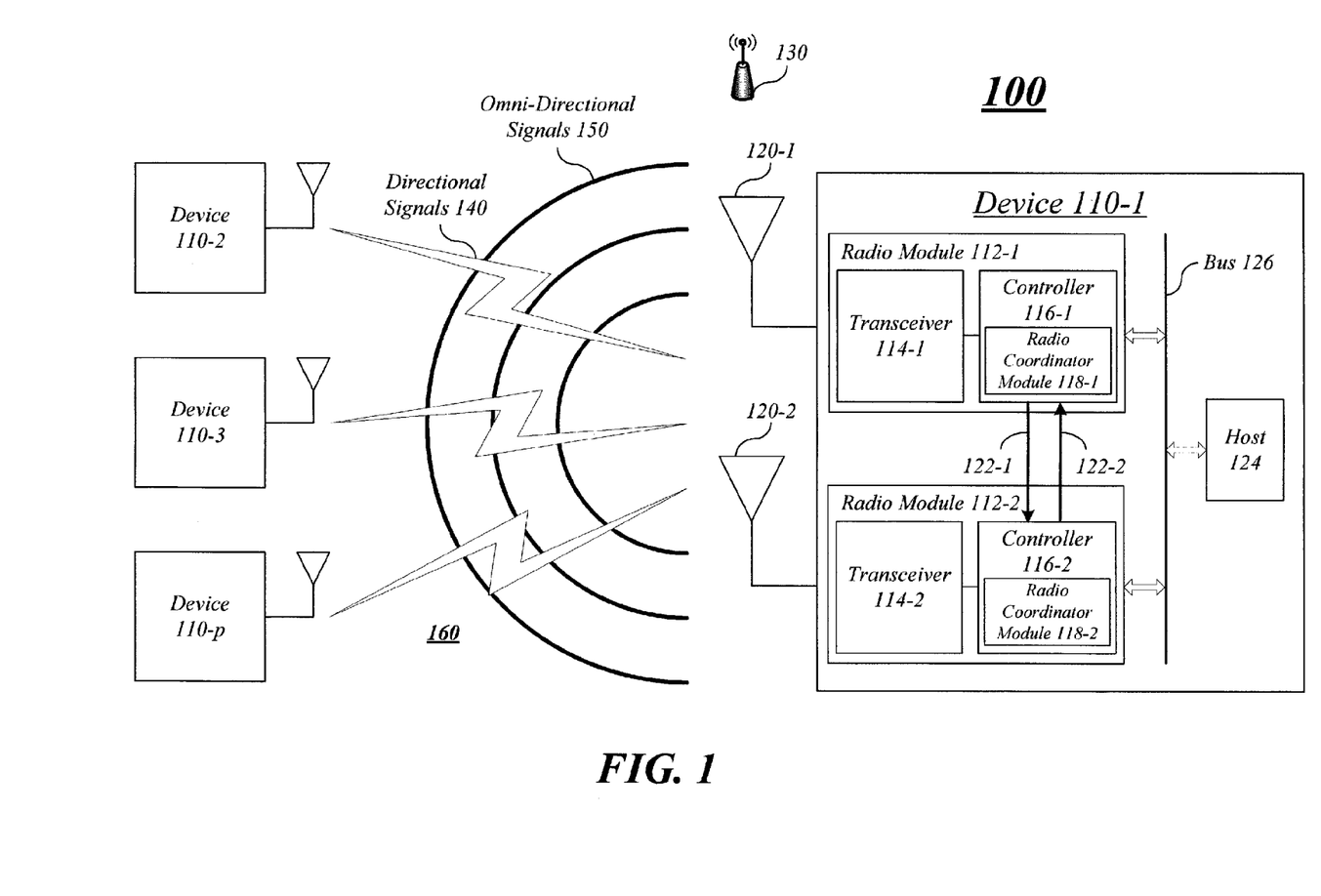
FIG. 1 illustrates one embodiment of a communications system.

FIG. 1 illustrates one embodiment of a communications system 100. The communications system 100 may comprise a wireless communication system having multiple wireless devices 110-1-$p$. The communications system 100 may optionally comprise one or more wireless devices 130 operating as access points to a network, such as a packet-switched network, a circuit-switched network, or a combination of both.

The various wireless devices 110-1-$p$ and 130 of the communications system 100 may communicate information using the wireless shared media 160. The wireless shared media 160 may represent various portions of RF spectrum. The information may comprise media information and control information. Media information is used herein in a very general sense and may refer to any data representing content meant for a user, such as application information, voice information, video information, audio information, text information, numerical information, alphanumeric symbols, graphics, images, symbols, and so forth. Control information is also used herein in a very general sense and may refer to any data representing commands, instructions or control words meant for an automated system. For example, control information may be used to set the rules to access the wireless shared media 160, or route media information through a system, or instruct a device to process the media information in a certain manner. The embodiments are not limited in this context.

The communications system 100 may include one or more wireless devices 130. The wireless device 130 may comprise a fixed wireless device. Examples for the fixed device 130 may include a wireless access point (AP), router, switch, hub, gateway, and so forth. In one embodiment, for example, the fixed device may comprise an AP for a WLAN system. In some cases, the fixed device 110 may also provide access to a network (not shown). The network may comprise, for example, a packet network such as the Internet, a corporate or enterprise network, a voice network such as the Public Switched Telephone Network (PSTN), and so forth. Although some embodiments may be described with the fixed device 130 implemented as an AP by way of example, it may be appreciated that other embodiments may be implemented using other wireless devices as well. The embodiments are not limited in this context.

The communications system 100 may include various wireless devices 110-1-$p$. The wireless devices 110-1-$p$ may each comprise mobile or fixed wireless devices. The wireless devices 110-1-$p$ may comprise various wireless interfaces and/or components to support wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, a directional antenna, an omni-directional antenna, a monopole antenna, a dipole antenna, an end fed antenna, a circularly polarized antenna, a micro-strip antenna, a diversity antenna, a dual antenna, an antenna array, and so forth. Certain devices may include antenna arrays of multiple antennas to implement various adaptive antenna techniques and spatial diversity techniques. Examples of wireless devices 110-1-$p$ may include, without limitation, a station, a subscriber station, a mobile station, a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smart phone, pager, messaging device, media player, digital music player, set-top box (STB), appliance, workstation, user terminal, mobile unit, consumer electronics, television, digital television, high-definition television, television receiver, high-definition television receiver, and so forth. The embodiments are not limited in this context.

The wireless devices 110-1-$p$ may each include or implement a dual-band radio architecture having multiple co-located radios capable of communicating information using different frequency bands. Each wireless device may have a radio architecture utilizing multiple radios co-located within the single wireless device, with each radio operating at a different frequency band. More particularly, one radio may be used to communicate media information, and the other radio may be used to communicate control information and/or media information. A control element may be implemented to coordinate and synchronize operations between the multiple co-located radios via signal paths 122-1-$e$. Specific radio selections and corresponding operating frequency bands for a given implementation may be performed in accordance with the advantages of a given radio to perform media operations or control operations. Combining the advantages of multiple co-located radios within a single wireless device may enhance the overall communications capabilities for a wireless device. Accordingly, this architecture may provide improved affordability, scalability, modularity, extendibility, or interoperability for a user, device or network.

The wireless devices 110-1-$p$ may include a wireless device 110-1. The wireless device 110-1 may be representative of any of the various wireless devices 110-1-$p$. The wireless device 110-1 may provide an illustrated example of a dual-band radio architecture using multiple co-located radios. The wireless device 110-1 may include, among other elements, multiple co-located radio modules 112-1-$a$ and a host processor 124 coupled by a bus 126. The radio modules 112-1-$a$ may comprise, among other elements, respective transceivers 114-1-$b$ coupled to respective controllers 116-1-$c$. The controllers 116-1-$c$ may comprise respective radio coordinator modules 118-1-$d$.

Although a limited number of elements are shown by the wireless device 110-1 by way of example and not limitation, it may be appreciated that other computing and communications elements common to electronic devices may be implemented by the wireless device 110-1. For example, the wireless device 110-1 may further include various computing resources or elements as appropriate for a given implementation, such as a processor, memory, chipsets, controllers, peripherals, input devices, output devices, and so forth. In another example, the wireless device 110-1 may further include various communications resources or elements as appropriate for a given implementation, such as baseband processors, filters, amplifiers, modulators, demodulators, multiplexers, mixers, switches and so forth. The embodiments are not limited in this context.

In the illustrated embodiment shown in FIG. 1, the wireless device 110-1 may include the host processor 124. The host processor 124 may be implemented as any general purpose processor, such as a complex instruction set computer (CISC) microprocessor, a reduced instruction set computing (RISC) microprocessor, a very long instruction word (VLIW) microprocessor, a processor implementing a combination of instruction sets, or other processor device. For example, the host processor 124 may be implemented as a general purpose processor such as a processor made by Intel® Corporation, Santa Clara, Calif. The host processor 124 may also be implemented as a dedicated processor, such as a controller, microcontroller, embedded processor, a digital signal processor (DSP), a network processor, a media processor, an input/output (I/O) processor, and so forth. The host processor 124 may couple to one or more memory units (not shown). The embodiments are not limited in this context.

The host processor 124 may be responsible for executing various software programs such as system programs and applications programs to provide computing and communications processing operations for the wireless device 110-1. The various system programs (e.g., operating system software) and applications programs (e.g., media playing programs, communications programs, productivity programs, and so forth) may generate various types of media information suitable for communication by the radio modules 112-1-$a$. For example, the system programs and applications programs may generate application data suitable for communication by the radio modules 112-1-$a$.

In the illustrated embodiment shown in FIG. 1, the wireless device 110-1 may include multiple co-located radio modules 112-1-$a$ coupled to the host processor 124 via the bus 126. The radio modules 112-1, 112-2 of the wireless device 110-1 may be arranged to operate in accordance with various shorter range wireless system architectures. Examples of such shorter range wireless system architectures may include without limitation systems compliant with various Institute of Electrical and Electronics Engineers (IEEE) standards, such as the IEEE 802.11 standards for Wireless Local Area Networks (WLANs) and variants, the IEEE 802.15 standards for Wireless Personal Area Networks (WPANs) and variants. Other shorter range wireless system architectures may include without limitation systems compliant with various WiMedia Alliance standards for Ultra-Wide Band (UWB) communications. The embodiments are not limited, however, to these described examples.

In one embodiment, for example, the radio module 112-2 may be arranged to operate as an IEEE 802.11 WLAN radio module. The IEEE 802.11x (e.g., 802.11 a/b/g/n) is a set of standards for WLAN computer communication in the 5 GHz and 2.4 GHz public spectrum bands. These WLAN standards are characterized by data rates ranging between 2 Megabits Per Second (Mbps) and 600 Mbps, and communication range up to 100 meters. Further, these WLAN standards typically utilize omni-directional antenna patterns to communicate information to a wider range of various wireless devices within a given communication range.

Referring to the illustrated embodiment shown in FIG. 1, the transceiver 114-2 of the WLAN radio module 112-2 may be coupled to an omni-directional antenna array 120-2. The omni-directional antenna array 120-2 may be operative to transmit the control information to a receiver using an omni-directional antenna pattern, as represented by the omni-directional signals 150. The omni-directional antenna array 120-2 may include one antenna or multiple antennas. The latter design may be desirable to increase system throughput or reception reliability, such as when implementing various diversity schemes or techniques. One example of a diversity scheme using multiple antennas may include a multiple-input multiple-output (MIMO) system, such as in the case of implementing an IEEE 802.11n radio module as the WLAN radio module 112-2.

In one embodiment, for example, the radio module 112-1 may be arranged to operate as an IEEE 802.15 WPAN radio module. The IEEE 802.15 is a set of standards for WPAN computer communication in the 57-64 GHz public spectrum band. These WPAN standards are characterized by data rates ranging between 50 Mbps and 5 Gigabits Per Second (Gbps), and communication ranges between 1 meter and 10 meters. Further, these WPAN standards typically utilize directional antenna patterns to communicate information to a narrower range of various wireless devices within a given communication range.

Referring to the illustrated embodiment shown in FIG. 1, the transceiver 114-1 of the WPAN radio module 112-1 may be coupled to a directional antenna array 120-1. The directional antenna array 120-1 may be operative to transmit the media information to a receiver using a directional antenna pattern, as represented by the directional signals 140. The directional antenna array 120-1 may include one antenna or multiple antennas. The latter design may be desirable when implementing various diversity schemes or techniques. It is worthy to note that omni-directional antenna arrays using omni-directional antenna patterns may also be implemented for the WPAN radio module 112-1, although this design option would increase the complexity of the radio architecture and corresponding implementation and operational costs.

The IEEE 802.15 set of WPAN standards include various Parts, one of which comprises the IEEE 802.15.3 Task Group 3 Standard 802.15.3-2003 titled "Part 15.3: Wireless Medium Access Control (MAC) and Physical Layer (PHY) Specifications for High Rate Wireless Personal Area Networks (WPANs)," Sep. 29, 2003 (the "IEEE 802.15.3 Specification"). The IEEE 802.15.3 Task Group 3 further includes a Task Group 3c (TG3c) Draft Standard IEEE 802.15.3c ("IEEE 802.15.3c Specification"). The IEEE 802.15.3c Specification is directed to a millimeter-wave (mm) based alternative physical layer (PHY) for the existing 802.15.3 WPAN Standard 802.15.3-2003. The mmWave WPAN will operate in the new and clear band including 57-64 GHz unlicensed band defined by FCC 47 CFR 15.255. The millimeter-wave WPAN will allow high coexistence (close physical spacing) with all other microwave systems in the 802.15 family of WPANs. In addition, the millimeter-wave WPAN will allow very high data rates over 2 Gbps applications such as high speed internet access, streaming content download, real time streaming, wireless display, wireless docking, and wireless data bus for cable replacement. Optional data rates in excess of 3 Gbps will also be provided.

In some cases, the radio module 112-2 of the wireless device 110-1 may include or operate as a piconet coordinator (PNC) for a WPAN. A WPAN is used to convey information over relatively short distances among a relatively few participants. Unlike a WLAN, a WPAN typically involve little or no infrastructure. An example of a basic WPAN structure is a piconet. A piconet is a wireless ad hoc data communications system which allows a number of independent data devices (e.g., wireless devices 110-1-*p*) to communicate with each other. A piconet is distinguished from other types of data networks in that communications are normally confined to a small area around a person or object that typically covers at most 10 meters in all directions and envelopes the person or object whether stationary or in motion. To establish a piconet among the wireless devices 110-1-*p*, one of the wireless devices (110-1) assumes the role of a PNC for the piconet. The PNC performs control and management operations for the piconet, such as providing the basic timing for the piconet with a beacon, managing security and quality of service (QoS) requirements, performing power management operations and channel access operations, and so forth.

The IEEE 802.15.3c Specification provides for higher data rates which are suitable for higher bandwidth applications, such as transmission of compressed or uncompressed multi-media streams of information (e.g., video on demand, HDTV, home theater, wireless display, etc.) for a home network. Such higher-speed communications are typically implemented using directional antenna patterns to reduce path loss and conserve power. Directional antenna patterns, however, may limit the number of devices that can receive such transmissions. Consequently, the radio module 112-1 may be suitable for communicating media information, but may have limitations when attempting to communicate control information due to the directional nature of the WPAN architecture.

To compensate for this and other limitations, the dual-band radio architecture of multiple co-located radio modules 112-1, 112-2 may be optimize to communicate different types of information using different radio modules 112-1, 112-2. For example, the radio module 112-1 implemented as an IEEE 802.15.3c WPAN radio module may be used to communicate media information, such as media information received from system programs and/or application programs executed by the host processor 124 via the bus 126. The radio module 112-2 implemented as an IEEE 802.11x WLAN radio module may be used to communicate control information, such as control information received from the controller 116-1 of the WPAN radio module 112-1.

In general operation, assume multiple wireless devices 110-1-*p* are within WPAN communication range and desire to form a piconet among each other. Further assume the wireless device 110-1 operates as the PNC for the piconet to establish and manage the piconet. The wireless device 110-1 may include multiple co-located transmitting radio modules 112-1, 112-2 comprising, among other elements, the transceiver 114-1, the controller 116-1, and the radio coordinator module 118-1. The radio coordinator module 118-1 of the controller 116-1 of the WPAN radio module 112-1 may be operative to receive and transmit one or more data flows having media information and control information. When implemented for transmit operations, the radio coordinator module 118-1 may switch or demultiplex the media information to a media flow path and the control information to a control flow path. When implemented for receive operations, the radio coordinator module 118-1 may combine or multiplex the media information and the control information to one or more receive data flows.

The transceiver 114-1 of the WPAN radio module 112-1 may be coupled to the radio coordinator module 118-1 and the media flow path. The transceiver 114-1 may be operative to receive the media information from the media flow path, and transmit the media information from the media flow path to a receiver. The receiver may be implemented as part of the radio modules 112-1, 112-2 of the wireless devices 110-2-*p*, such as the wireless device 110-2, for example. The transceiver 114-1 may transmit the media information using a first frequency band allocated for a WPAN. An example of a first frequency band allocated for a WPAN may include the 60 GHz (e.g., 57-64 GHz) frequency band, which may include up to 5 GHz of spectral space.

The transceiver 114-2 of the WLAN radio module 112-2 may also be coupled to the radio coordinator module 118-1 and the control flow path via the controller 116-2 and signal paths 122-1-*e*. The transceiver 114-2 may be operative to receive the control information from the control flow path, and transmit the control information from the control flow path to the receiver (e.g., the wireless device 110-2) using a second frequency band allocated for a WLAN. An example of a second frequency band allocated for a WLAN may include the 2.4 GHz or 5 GHz frequency bands.

The dual-band radio architecture utilizes the corresponding dual-MAC architecture via the controllers 116-1, 116-2. The controllers 116-1, 116-2 may coordinate operations via the respective radio coordinator modules 118-1, 118-2. The controllers 118-1, 118-2 may exchange information via the signal paths 122-1, 122-2. For example, the controllers 118-1, 118-2 may exchange information regarding the operational status or states of the respective radio modules 112-1, 112-2. In another example, the controllers 118-1, 118-2 may exchange control information designated for the respective WPAN or WLAN. For example, control information to manage and coordinate operations for the WPAN typically communicated by the WPAN radio module 112-1 may instead be communicated by the WLAN radio module 112-2 via the signal path 122-1, and vice-versa using the signal path 122-2.

In some cases, the controllers 118-1, 118-2 may convey media information designated for the respective WPAN or WLAN. For example, media information for the WPAN typically communicated by the WPAN radio module 112-1 may instead be communicated by the WLAN radio module 112-2 via the signal path 122-1, and vice-versa using the signal path 122-2. This may be accomplished if both radio modules 112-1, 112-2 utilize the same or similar communication schemes and parameters, such as orthogonal frequency-division multiple (OFDM) techniques, carrier units, sub-carrier units, and so forth. This may also reduce the complexity of the dual-MAC architecture implemented by the controllers 116-1, 116-2.

The radio modules 112-1, 112-2 may communicate the media information and the control information using a separate media channel and control channel. Using the separate and lower band WLAN radio module 112-2 to create a control channel used to communicate control information in effect creates an out-of-band (OOB) control channel. The use of an OOB control channel provides several advantages, as described more fully below, but involves some level of coordination and synchronization operations between the media channel and control channel. Because of the directional nature of transmissions by the WPAN radio module 112-1, the conventional carrier sensing solutions typically used by the WLAN radio module 112-2 are not suited for WPAN operations. Rather, the WPAN radio module 112-1 performs channel time scheduling using Time Division Multiple Access (TDMA) technology. Channel time reservations are performed for each super-frame. A super-frame is the basic timing division for a TDMA system. The channel time reservations are communicated in the beacon frame(s) sent on the control channel. In conventional WPAN systems, beacon(s) are transmitted immediately before the start of the superframe. Consequently, the OOB control channel created by the WLAN radio module 112-2 may need to implement various techniques to support real-time or near real-time synchronization with the media channel created by the WPAN radio module 112-1. This may pose some design challenges for the dual-MAC layer, which may be described in more detail with reference to FIG. 2.

Figure 2:
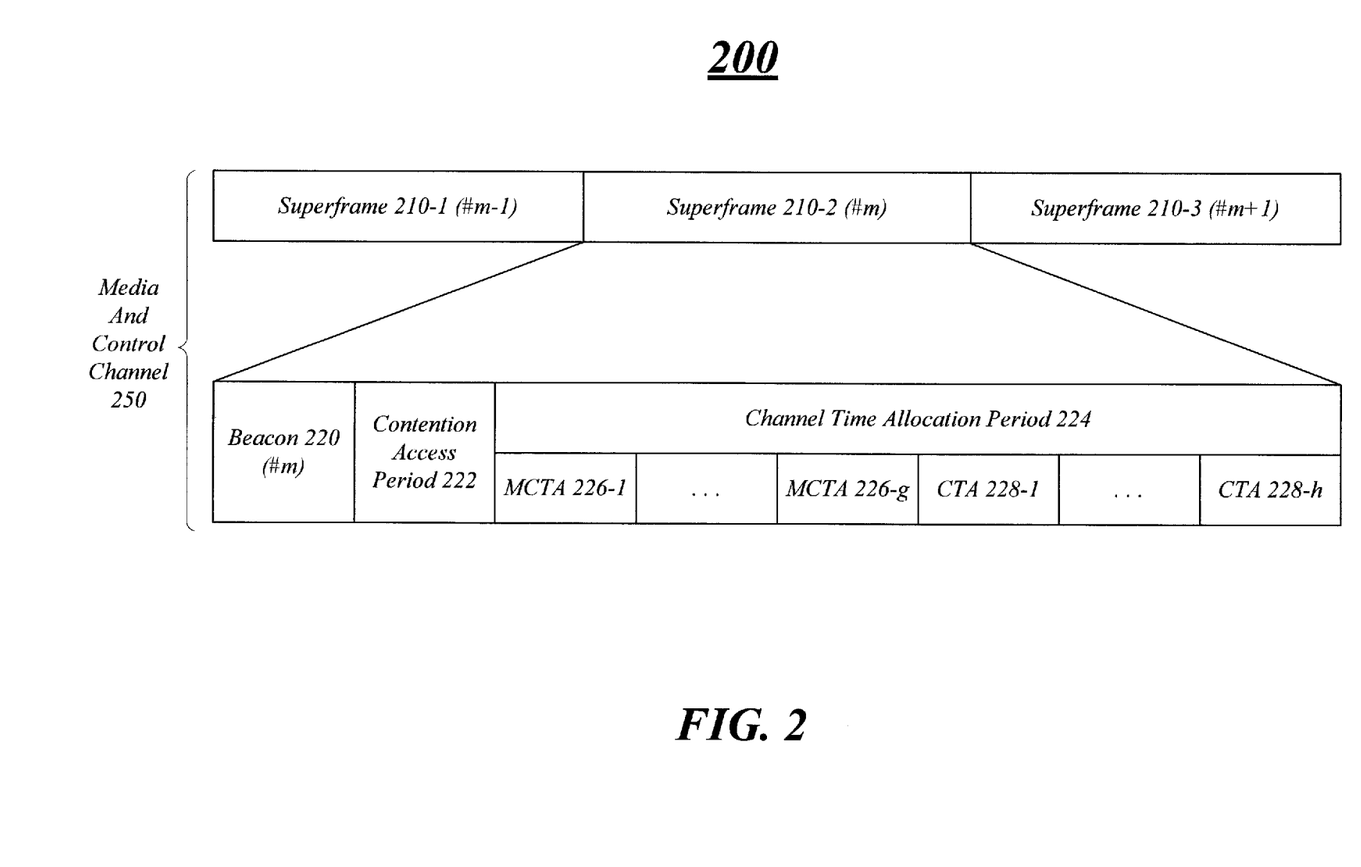
FIG. 2 illustrates one embodiment of a first communication frame.

FIG. 2 illustrates one embodiment of a communication frame 200. The communication frame 200 may include one or more superframes as defined by the IEEE 802.15.3 Specification. A superframe is the basic time division of an 802.15.3 piconet containing a beacon, the channel time allocation period, and optionally the contention access period. In a conventional WPAN system, media information and control information for the communication frame 200 are communicated over a common media and control channel 250, or an in-band control channel utilizing the same or similar frequency band as the media channel.

In the illustrated embodiment shown in FIG. 2, the communication frame 200 comprises a logical stream of multiple superframes 210-1-$f$. The superframes 210-1-$f$ may include a superframe 210-1 representing a previous superframe (#m−1), a superframe 210-2 representing a current superframe (#m), and a superframe 210-3 representing a subsequent superframe (#m+1). The current superframe 210-2 may be representative of the other superframes 210-1, 210-3, and is composed of three parts including a beacon message 220 (#m), an optional contention access period (CAP) 222, and a channel time allocation period 224. The beacon message 220 is used to set the timing allocations and to communicate management information for a piconet. The beacon message 220 comprises a beacon frame, as well as any Announce commands sent by the PNC as a beacon extension. The CAP 222 is used to communicate commands and/or asynchronous data if it is present in the superframe 210-2. The channel time allocation period 224 is composed of various channel time allocations (CTAs), including one or more management CTA (MCTA) 226-1-$g$ and one or more CTA 228-1-$h$. The MCTA 226-1-$g$ are used for control channel connections and control information. The CTA 228-1-$h$ are used for isochronous streams and asynchronous media channel connections and media information.

Figure 3:
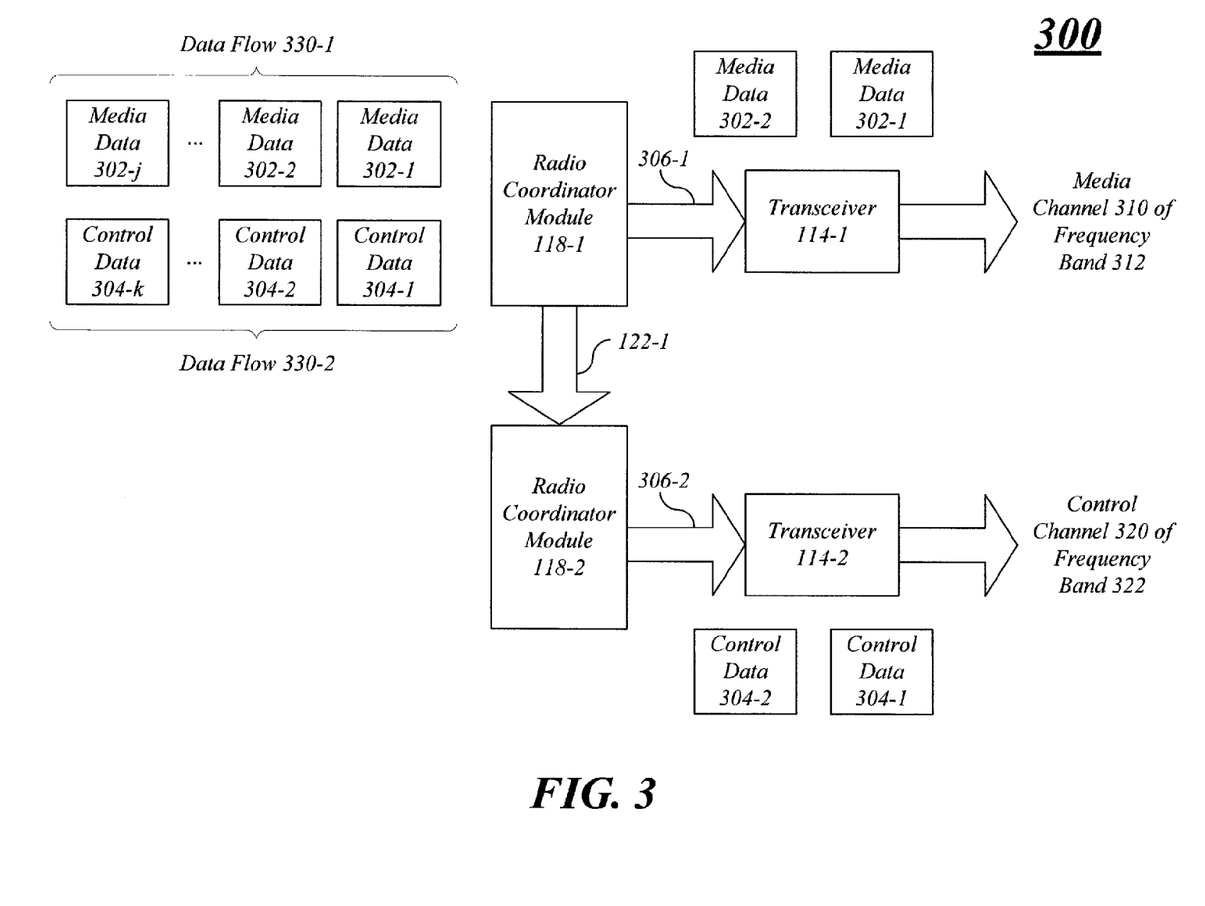
FIG. 3 illustrates one embodiment of a first transmitter.

FIG. 3 illustrates one embodiment of a transmitter 300. The transmitter 300 may be representative of the transmitting portions of the radio modules 112-1, 112-2 arranged to transmit media information and control information in accordance with one or more superframes 210-1-$f$. As shown in FIG. 3, the radio coordinator module 118-1 of the radio module 112-1 may receive various transmit data flows 330-1-$i$, such as transmit data flows 330-1, 330-2. In one embodiment, the transmit data flows 330-1, 330-2 may comprise two different data flows, with the transmit data flow 330-1 comprising a media data flow having media information blocks 302-1-$j$, and the transmit data flow 330-2 comprising a control data flow having control information blocks 304-1-$k$. In one embodiment, the transmit data flows 330-1, 330-2 may comprise a single data flow, with the media information blocks 302-1-$j$ and control information blocks 304-1-$k$ interleaved or multiplexed into a single data flow. Although the media information and control information of the data flows 330-1, 330-2 are described in terms of logical blocks of information, it may be appreciated that the media information and control information of the data flows 330-1, 330-2 may comprise logical streams of information as well. The embodiments are not limited in this context.

In a transmit mode, the radio coordinator module 118-1 may switch or demultiplex the media information to a media flow path 306-1 and the control information to a control flow path 306-2. It is worthy to note that the media flow path 306-1 is an intra-module path within the radio module 112-1, while the control flow path 306-2 is an inter-module path that traverses the radio modules 112-1, 112-2 via the signal paths 122-1, 122-2.

The transceiver 114-1 of the radio module 112-1 may receive the media information blocks 302-1-$j$ from the media flow path 306-1. The transceiver 114-1 may transmit the media information blocks 302-1-$j$ from the media flow path 306-1 to one or more receiving wireless devices 110-2-$p$ that are connected to the piconet. The transceiver 114-1 transmits the media information over a media channel 310 of a frequency band 312. For example, the transceiver 114-1 transmits the media information as one or more CTA 228-1-*h* comprising part of a superframe 210-1-*f*.

The transceiver 114-2 of the radio module 112-2 may receive the control information blocks 304-1-*k* from the control flow path 306-2 via the signal path 122-1 between the radio coordinator modules 118-1, 118-2. The transceiver 114-2 may transmit the control information blocks 304-1-*k* from the control flow path 306-2 to the one or more receiving wireless devices 110-2-*p* that are connected to the same piconet receiving the media information blocks 302-1-*j*. The transceiver 114-2 transmits the control information over a control channel 320 of a frequency band 322. For example, the transceiver 114-1 transmits the control information as one or more MCTA 226-1-*g* comprising part of a superframe 210-1-*f*.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 4:
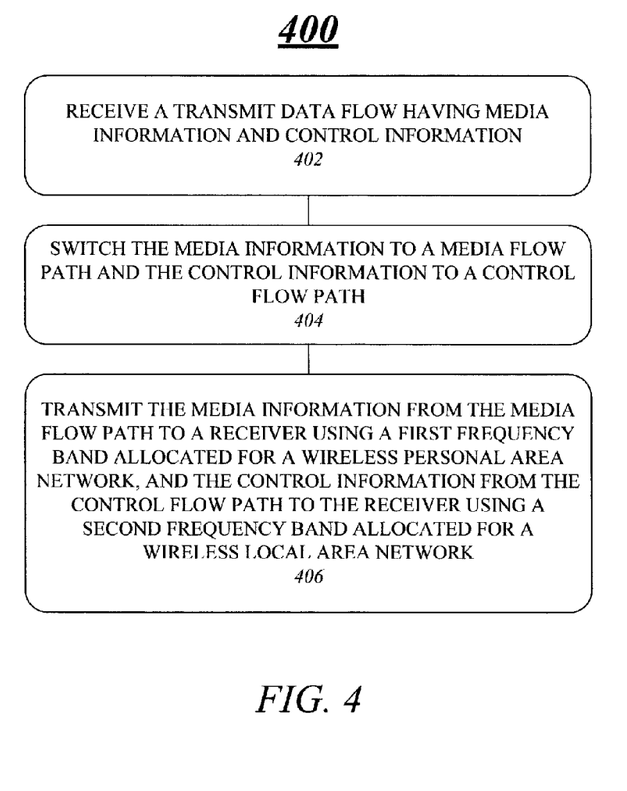
FIG. 4 illustrates one embodiment of a logic flow.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., instructions, data, and/or code) to be executed by a logic device. For purposes of illustration, and not limitation, the logic flow 400 is described with reference to FIGS. 1-3.

The logic flow 400 may illustrate various operations for the wireless devices 110-1-*p* of the wireless communications network 100 and/or the transmitter 300. As shown in FIG. 4, the logic flow 400 may receive a transmit data flow having media information and control information at block 402. The logic flow 400 may switch the media information to a media flow path and the control information to a control flow path at block 404. The logic flow 400 may transmit the media information from the media flow path to a receiver using a first frequency band allocated for a wireless personal area network, and the control information from the control flow path to the receiver using a second frequency band allocated for a wireless local area network at block 406. The embodiments are not limited in this context.

In one embodiment, the logic flow 400 may receive a transmit data flow having media information and control information at block 402. For example, the radio coordinator module 118-1 of the controller 116-1 of the radio module 112-1 may receive a transmit data flow 330 with combined or separated media data flow 330-1 and control data flow 330-2.

In one embodiment, the logic flow 400 may switch the media information to a media flow path and the control information to a control flow path at block 404. For example, the radio coordinator module 118-1 may switch the media information from the media data flow 330-1 to the media flow path 306-1, and the control information from the control data flow 330-2 to the control flow path 306-2.

In one embodiment, the logic flow 400 may transmit the media information from the media flow path to a receiver using a first frequency band allocated for a wireless personal area network, and the control information from the control flow path to the receiver using a second frequency band allocated for a wireless local area network at block 406. For example, the transceiver 114-1 of the WPAN radio module 112-1 may transmit the media information from the media flow path 306-1 to a receiver implemented by a wireless device 110-2-*p* using the frequency band 312 allocated for the media channel 310 for the WPAN. The transceiver 114-2 of the WLAN radio module 112-2 may transmit the control information from the control flow path 306-2 to the same receiver that receives media information from the transceiver 114-1 using the frequency band 322 allocated for the control channel 320 for the WLAN.

With the use of a dual-band radio architecture having multiple co-located radio modules 112-1, 112-2, and with one of the radio modules 112-2 used to create an OOB control channel 320, various operational advantages may be realized. For example, the strict timing requirements for synchronizing control information and media information may be somewhat relaxed since a separate control channel 320 is available to coordinate certain operations of the wireless devices 110-1-*p* concurrently with media transport operations without necessarily disrupting communication of media information on the media channel 110.

In one embodiment, the transceiver 114-2 of the radio module 112-2 may be operative to transmit control information for a subsequent communication frame during a current communication frame from the control flow path 306-2 to a receiver using the frequency band 322 allocated for the control channel 320 of the WLAN. For example, control information needed to communicate information for a subsequent superframe 210-3 may be communicated during a current superframe 210-2, thereby preparing the radio module 112-1 of the transmitting wireless device 110-1 to transmit media information during the subsequent superframe 210-3, and similarly the corresponding radio modules 112-1 of the receiving wireless devices 110-2-*p* to receive the media information during the subsequent superframe 210-3. Various use scenarios and examples of such operations may be provided with reference to FIGS. 5 and 6.

Enhanced Beacon Transmission Techniques

In the dual-band radio architecture used by the wireless devices 110-1-*p* utilizing an OOB control channel 320, the dual-MAC layer operations performed by the controllers 116-1, 116-2 may become more complex. This may be particularly true with respect to transmitting the beacon message 220. In conventional WPAN systems, as illustrated by the communication frame 200, the beacon message 220 is transmitted immediately before the start of each superframe 210-1-*f*. Synchronizing beacons at the start of every superframe 210-1-*f*, however, may increase the complexity of the controllers 116-1, 116-2 implementing the dual-MAC layer operations for the corresponding radio modules 112-1, 112-2.

To solve these and other problems, the radio coordinator modules 118-1, 118-2 implemented by the respective controllers 116-1, 116-2 may be arranged to interoperate to implement an enhanced beacon transmission technique that provides for transmissions of multiple beacon messages 220 under a distributed MAC architecture without necessarily having to explicitly allocate a beacon slot to each wireless device 110-1-*p*. This may reduce corresponding MAC complexity of the respective controllers 116-1, 116-2. The enhanced beacon transmission technique may be described in more detail with reference to FIG. 5.

Figure 5:
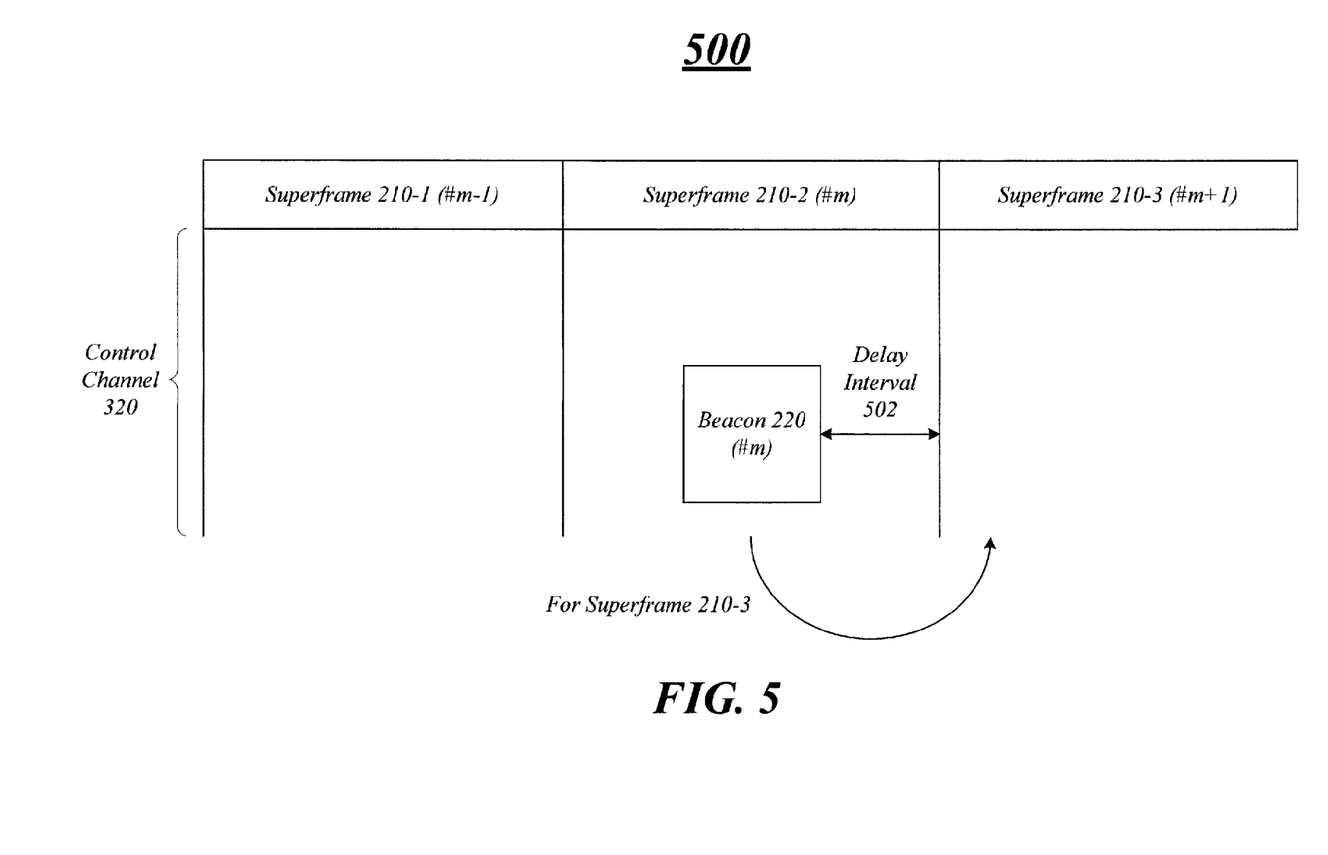
FIG. 5 illustrates one embodiment of a second communication frame.

FIG. 5 illustrates one embodiment of a communication frame 500. Similar to the communication frame 200, the communication frame 500 may comprise superframes 210-1-*f*. Unlike the communication frame 200, however, the beacon message 220 is not transmitted at a start time for each superframe 210-1-*f*. Rather, the transceiver 114-2 is arranged to transmit a beacon message 220 and a delta interval 502 designated for a subsequent communication frame 210-3 during a current communication frame 210-2 as the control information from the control flow path 306-2 to a receiver using the frequency band 322 allocated for the control channel 320 of the WLAN. The delta interval 502 may represent an estimated time interval between transmission of the beacon message 220 and a start time for the subsequent communication frame 210-3. In this manner, the receiving devices 110-2-*p* may receive the beacon message 220 and the delta interval 502, and use this control information to synchronize when to begin receiving and/or transmitting information belonging to the subsequent superframe 210-3.

By the WLAN radio module 112-2 transmitting the beacon message 220 and the delta interval 502 in a current superframe 210-2, the WPAN radio module 112-1 may avoid the need to transmit the beacon message 220 at the start of the subsequent superframe 210-3. In some cases, however, the receiving devices 110-2-*p* may be unable or unwilling to utilize the lower band WLAN radio module 112-2 to receive the beacon message 220 and the delta interval 502. Further, some legacy receiving devices 110-2-*p* may not have a second radio module 112-2. In such cases, the WPAN radio module 112-1 may be arranged to transmit the beacon message 220 at the beginning of each superframe 210-1-*f* per conventional WPAN operations to accommodate such devices.

Enhanced Bandwidth Reservation Techniques

In conventional WPAN systems, as illustrated by the communication frame 200, the beacon message 220 is transmitted immediately before the start of each superframe 210-1-*f*. In some cases, however, channel time reservations may need to be updated during a given superframe 210-1-*f* in response to changes in channel quality and/or traffic conditions. This may be difficult using an in-band control channel, since conventional WPAN systems may need to wait until the start of a subsequent superframe 210-3 prior to receiving a channel schedule with new channel assignments conveyed in a beacon frame generated in response to the bandwidth reservation request. This may introduce an unnecessary amount of latency in the WPAN system.

To solve these and other problems, the dual-band radio architecture may implement an enhanced bandwidth reservation technique in which the channel time reservation can be updated dynamically using the OOB control channel 320. More particularly, the sender device transmits a bandwidth reservation request to the PNC on the control channel in a current superframe 210-2, and if the request is approved, the PNC broadcasts the new channel time schedule (e.g., a channel time block extension or a channel time block reservation where device S transmits to device R) in the same superframe 210-2. In this scenario, a receiving wireless device 110-2-*p* will be able to use the new channel schedule immediately in the current superframe 210-2. The new channel schedule with the new reservation should avoid conflicts with the existing reservations of the other wireless devices 110-1-*p*. If the change in the channel time allocation is permanent, it will be reflected in the beacon message 220 transmitted at the beginning of the subsequent superframe 210-3. The enhanced bandwidth reservation technique may be described in more detail with reference to FIG. 6.

Figure 6:
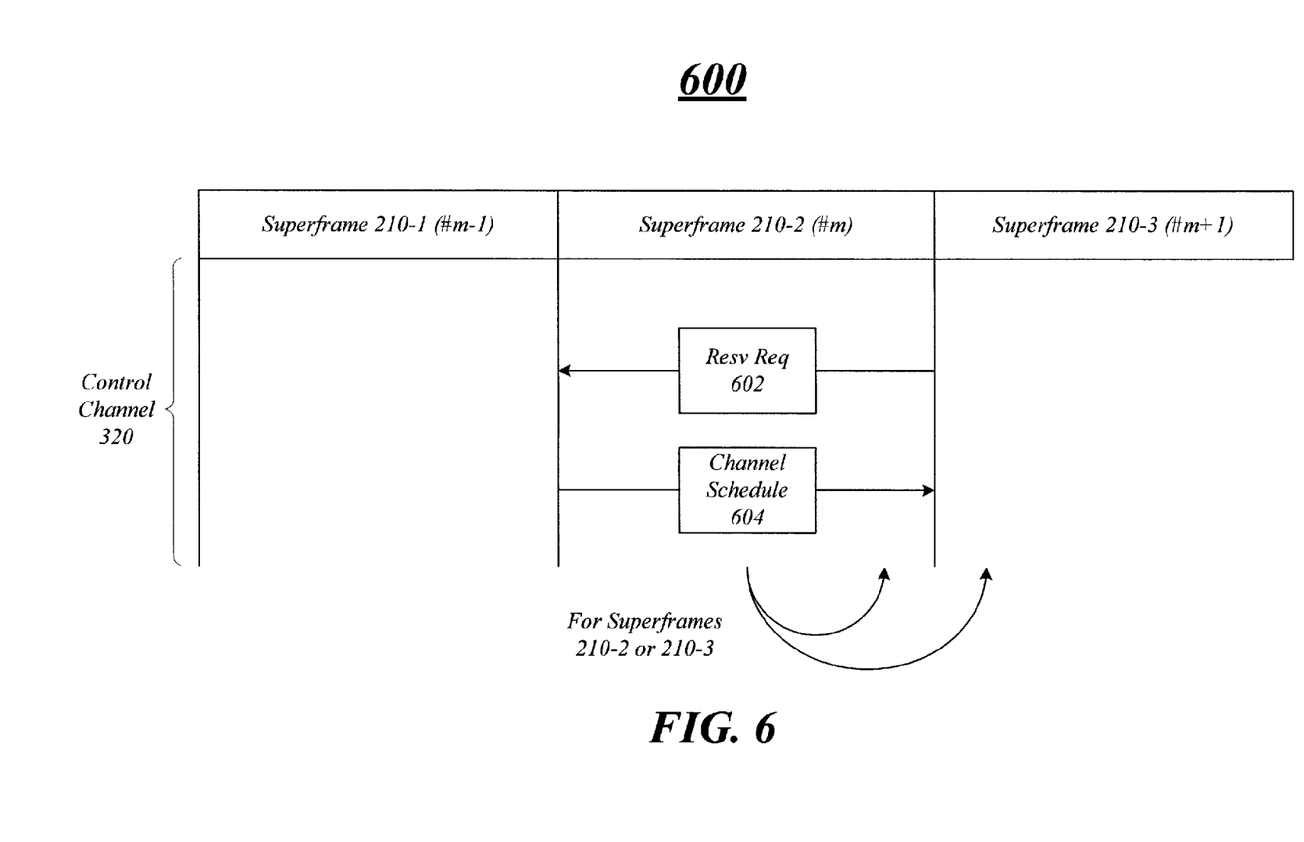
FIG. 6 illustrates one embodiment of a third communication frame.

FIG. 6 illustrates one embodiment of a communication frame 600. Similar to the communication frame 200, the communication frame 600 may comprise superframes 210-1-*f*. Unlike the communication frame 200, however, a new channel schedule is not necessarily transmitted at the start time for a subsequent superframe 210-3. Rather, the controller 116-1 coupled to the transceiver 114-1 may be operative to receive a bandwidth reservation request 602, and generate a channel schedule 604 in response to the bandwidth reservation request 602. The transceiver 114-1 may be operative to transmit the channel schedule 604 designated for the current superframe 210-2 during the same superframe 210-2 as the control information from the control flow path 306-2 to a receiver using the frequency band 322 allocated for the control channel 320 of the WLAN in response to the bandwidth reservation request 602. In this manner, the receiving devices 110-2-*p* may receive the channel schedule 604, and use this control information to determine which channels to receive and/or transmit information belonging to the current superframe 210-2.

Enhanced Concurrent Communication Techniques

The availability of the OOB control channel 320 provided by the dual-band radio architecture used by the wireless devices 110-1-*p* offers advantages other than merely conveying control information. In some cases, the control channel 320 may also be used to transmit media information. Various embodiments may implement enhanced concurrent communication techniques where a media data flow can be sent substantially simultaneously over the media channel 310 and the control channel 320. For example, the transmit portion of the radio module 112-1 for a wireless device 110-1 demultiplexes the media data flow into two streams that are transmitted separately on the respective media channel 310 and control channel 320. The receive portion of the radio module 112-1 for a wireless device 110-2 multiplexes the two media streams back into the original media data flow. Each data packet is assigned a sequence number by the transmit portion of the radio module 112-1, which allows the receive portion of the radio module 112-1 to reassemble packets in the right order. The amount of data allocated to each of the streams may change dynamically with respect to the current channels conditions. The enhanced concurrent communication technique may be described in more detail with reference to FIGS. 7 and 8.

Figure 7:
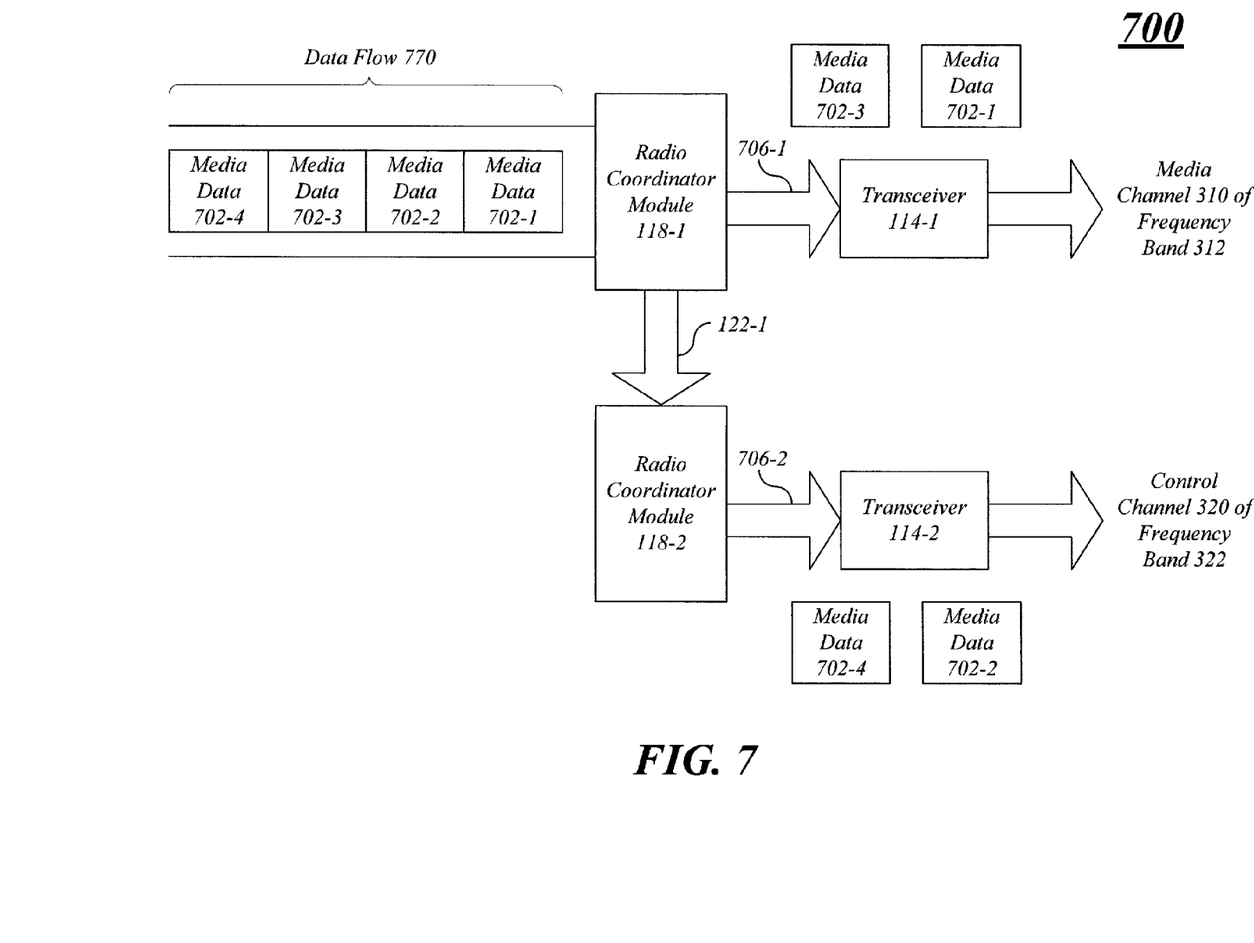
FIG. 7 illustrates one embodiment of a second transmitter.

FIG. 7 illustrates one embodiment of a transmitter 700. The transmitter 700 may be similar to the transmitter 300, and represents a transmit portion of the radio modules 112-1, 112-2 implemented for a given transmitting wireless device 110-1-*p* (e.g., the wireless device 110-1). As shown in FIG. 7, the radio coordinator module 118-1 of the wireless device 110-1 may be operative to switch or demultiplex a first portion of the media information from a media data flow 770 to the media flow path 706-1, and a second portion of the media information from the media data flow 770 to the control flow path 706-2 via the signal path 122-1 and the radio coordinator module 118-2. The first and second portions of media information switched to the respective flow paths 706-1, 706-2 may be allocated or divided in any desired manner. In the illustrated embodiment shown in FIG. 7, the first and second portions of media information may comprise alternate media information blocks 702-1-*l*, where the odd number of media information blocks 702-1, 702-3 are switched to the media flow path 706-1, and the even number of media information blocks 702-2, 702-4 are switched to the control flow path 706-2. Any desired allocation scheme, however, may be used to optimize a given level of resource utilization and overall throughput of the radio modules 112-1, 112-2.

In a transmit mode, the transceiver 114-1 may receive the first portion of media information from the media flow path 706-1, and transmit the first portion of the media information from the media flow path 706-1 to a receiver using the frequency band 312 allocated for the media channel 310 of the WPAN. The second transceiver 114-2 may receive the second portion of media information from the control flow path 706-2, and transmit the second portion of the media information from the control flow path 706-2 to the receiver using the frequency band 322 allocated for the control channel 320 of the WLAN.

Figure 8:
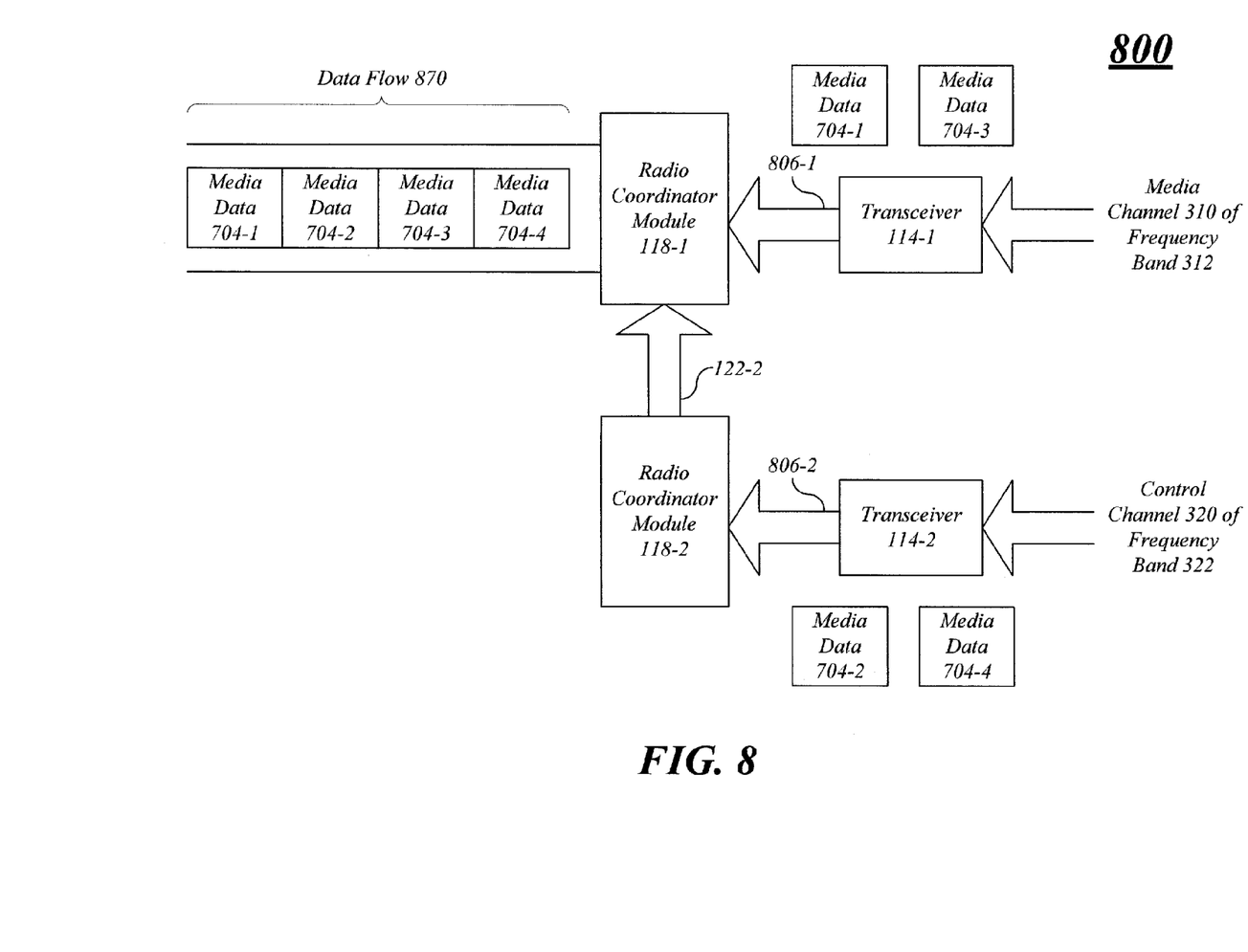
FIG. 8 illustrates one embodiment of a receiver.

FIG. 8 illustrates one embodiment of a receiver 800. The receiver 800 may represent a receive portion of the radio modules 112-1, 112-2 implemented for a given receiving wireless device 110-1-p (e.g., the wireless device 110-2). In a receiver mode, the transceiver 114-1 of the wireless device 110-2 may be operative to receive the first portion of media information from the transceiver 114-1 of the wireless device 110-1 over the frequency band 312 allocated for the media channel 310 of the WPAN. The transceiver 114-2 of the wireless device 110-2 may be operative to receive the second portion of media information from the transceiver 114-2 of the wireless device 110-1 over the frequency band 322 allocated for the control channel 320 of the WLAN. The radio coordinator module 118-1 of the wireless device 110-2 may be coupled to the transceivers 114-1, 114-2 of the wireless device 110-2. The radio coordinator module 118-1 of the wireless device 110-2 may be operative to receive the first and second portions of the media information from the respective transceivers 114-1, 114-2 of the wireless device 110-2, and combine the first and second portions of media information into a receive data flow 870, which is similar or the same as the transmit data flow 770.

The enhanced concurrent communication techniques may offer several advantages over conventional WPAN systems or WLAN systems. For example, the enhanced concurrent communication techniques enable the use of the OOB control channel 320 for communication of media information. In another example, the enhanced concurrent communication techniques improve communication resource utilization and overall communication throughput. In yet another example, the enhanced concurrent communication techniques provides a mechanism to dynamically modify the amount of media information sent over each of the media channel 310 and the control channel 320 with respect to the current WPAN environment and traffic loads.

It is worthy to note that although the radio coordination modules 118-1, 118-2 are described as implemented by the respective controllers 116-1, 116-2, it may be appreciated that the radio coordination modules 118-1, 118-2 may be implemented by other parts of the wireless devices 110-1-p. For example, the radio coordination modules 118-1, 118-2 may be implemented by the host processor 124. Further, although the radio coordination operations are implemented by multiple radio coordination modules 118-1, 118-2, it may be appreciated that the radio coordination operations may be implemented by a single radio coordination module 118 shared between the controllers 116-1, 116-2.

In some cases, various embodiments may be implemented as an article of manufacture. The article of manufacture may include a computer-readable medium or storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following.

The invention claimed is:

1. An apparatus, comprising:
a radio coordinator module operative to receive a transmit first data flow having first media information and control information, switch the first media information to a media flow path and the control information to a control flow path, receive a transmit second data flow having second media information, and switch a first portion of the second media information to the media flow path and a second portion of the second media information to the control flow path;
a first transceiver to couple to the radio coordinator module, the first transceiver operative to transmit the first media information and a first portion of the second media information from the media flow path to a receiver using a first frequency band allocated for a wireless personal area network; and
a second transceiver to couple to the radio coordinator module, the second transceiver operative to transmit the control information and a second portion of the second media information from the control flow path to the receiver using a second frequency band allocated for a wireless local area network and transmit a beacon message and a delta interval designated for a subsequent communication frame during a current communication frame as the control information from the control flow path to the receiver using the second frequency band allocated for the wireless local area network, the delta interval representing an estimated time interval between transmission of the beacon message and a start time for the subsequent communication frame.

2. The apparatus of claim 1, comprising a directional antenna array to couple to the first transceiver, the directional antenna array operative to transmit the first media information to the receiver using a directional antenna pattern.

3. The apparatus of claim 1, comprising an omni-directional antenna array to couple to the second transceiver, the omni-directional antenna array operative to transmit the control information to the receiver using an omni-directional antenna pattern.

4. The apparatus of claim 1, the second transceiver operative to transmit control information for a current or subsequent communication frame during a current communication frame from the control flow path to the receiver using the second frequency band allocated for the wireless local area network.

5. The apparatus of claim 1, comprising a controller to couple to the second transceiver, the controller operative to receive a bandwidth reservation request, and generate a channel schedule in response to the bandwidth reservation request.

6. The apparatus of claim 1, the second transceiver operative to transmit an updated channel schedule designated for a current subsequent communication frame as the control information from the control flow path to the receiver using the second frequency band allocated for the wireless local area network in response to the bandwidth reservation request.

7. The apparatus of claim 1, the first transceiver operative to transmit a first portion of the second media information from the media flow path to the receiver using the first frequency band allocated for the wireless personal area network, and the second transceiver operative to transmit a second portion of the second media information from the control flow path to the receiver using the second frequency band allocated for the wireless local area network.

8. A system, comprising:
a first wireless device having a piconet coordinator, the piconet coordinator operative to establish a piconet with at least a second wireless device, the first wireless device having multiple co-located transmitting radio modules comprising:
a first radio coordinator module operative to receive a transmit first data flow having first media information and control information, and switch the first media information to a media flow path and the control information to a control flow path;
a first transceiver to couple to the radio coordinator module, the first transceiver operative to transmit the first media information from the media flow path to a receiver using a first frequency band allocated for a wireless personal area network; and
a second transceiver to couple to the radio coordinator module, the second transceiver operative to transmit control information from the control flow path to the receiver using a second frequency band allocated for a wireless local area network and transmit a beacon message and a delta interval designated for a subsequent communication frame during a current communication frame as the control information from the control flow path to the receiver using the second frequency band allocated for the wireless local area network, the delta interval representing an estimated time interval between transmission of the beacon message and a start time for the subsequent communication frame,
wherein the first transceiver operative to receive a transmit second data flow having second media information and transmit a first portion of the second media information from the media flow path to the receiver using the first frequency band allocated for the wireless personal area network, and the second transceiver operative to transmit a second portion of the second media information from the control flow path to the receiver using the second frequency band allocated for the wireless local area network.

9. The system of claim 8, comprising a directional antenna array to couple to the first transceiver, the directional antenna array operative to transmit the first media information to the receiver using a directional antenna pattern, and an omni-directional antenna array to couple to the second transceiver, the omni-directional antenna array operative to transmit the control information to the receiver using an omni-directional antenna pattern.

10. The system of claim 8, the second transceiver operative to transmit a channel schedule designated for a current communication frame as the control information from the control flow path to the receiver using the second frequency band allocated for the wireless local area network in response to the bandwidth reservation request.

11. The system of claim 8, the second wireless device having multiple co-located receiving radio modules comprising:
a third transceiver operative to receive the first portion of the second media information from the first transceiver over the first frequency band allocated for the wireless personal area network;
a fourth transceiver operative to receive the second portion of the second media information from the second transceiver over the second frequency band allocated for the wireless local area network; and
a second radio coordinator module to couple to the third transceiver and the fourth transceiver, the second radio coordinator module operative to receive the first and second portions of the second media information from the respective third and fourth transceivers, and combine the first and second portions of the second media information into a receive second data flow.

12. A method, comprising:
receiving a transmit first data flow having first media information and control information;
switching the first media information to a media flow path and the control information to a control flow path;
transmitting the first media information from the media flow path to a receiver using a first frequency band allocated for a wireless personal area network, and the control information from the control flow path to the receiver using a second frequency band allocated for a wireless local area network;
transmitting a beacon message and a delta interval designated for a subsequent communication frame during a current communication frame as the control information from the control flow path to the receiver using the second frequency band allocated for the wireless local area network, the delta interval representing an estimated time interval between transmission of the beacon message and a start time for the subsequent communication frame;
receiving a transmit second data flow having second media information; and
switching a first portion of the second media information to the media flow path and a second portion of the second media information to the control flow path.

13. The method of claim 12, comprising transmitting the first media information to the receiver using a directional antenna pattern, and the control information to the receiver using an omni-directional antenna pattern.

14. The method of claim 12, comprising transmitting control information for a current or subsequent communication frame during a current communication frame from the control flow path to the receiver using the second frequency band allocated for the wireless local area network.

15. The method of claim 12, comprising transmitting a channel schedule designated for a current communication frame as the control information from the control flow path to the receiver using the second frequency band allocated for the wireless local area network in response to the bandwidth reservation request.

16. The method of claim 12, comprising transmitting a first portion of the second media information from the media flow path to the receiver using the first frequency band allocated for the wireless personal area network, and a second portion of the second media information from the media flow path to the receiver using the second frequency band allocated for the wireless local area network.

17. The method of claim 12, comprising:
receiving a first portion of the second media information using the first frequency band allocated for the wireless personal area network, and a second portion of the second media information using the second frequency band allocated for the wireless local area network; and
combining the first and second portions of the second media information to form a receive second data flow substantially similar to the transmit second data flow.

18. An article comprising a non-transitory computer-readable storage medium containing instructions that if executed enable a system to:
receive a transmit first data flow having first media information and control information;
demultiplex the first media information to a media flow path and the control information to a control flow path;
transmit the first media information from the media flow path to a receiver using a first frequency band allocated for a wireless personal area network, and the control information from the control flow path to the receiver using a second frequency band allocated for a wireless local area network;
transmit a beacon message a beacon message and a delta interval designated for a subsequent communication frame during a current communication frame as the control information from the control flow path to the receiver using the second frequency band allocated for the wireless local area network, the delta interval representing an estimated time interval between transmission of the beacon message and a start time for the subsequent communication frame;
receive a transmit second data flow having second media information; and
switch a first portion of the second media information to the media flow path and a second portion of the second media information to the control flow path.

19. The article of claim 18, further comprising instructions to transmit the first media information to the receiver using a directional antenna pattern, and the control information to the receiver using an omni-directional antenna pattern.

20. The article of claim 18, further comprising instructions to transmit control information for a subsequent communication frame during a current communication frame from the control flow path to the receiver using the second frequency band allocated for the wireless local area network.

21. The article of claim 18, further comprising instructions to transmit a channel schedule designated for a current communication as the control information from the control flow path to the receiver using the second frequency band allocated for the wireless local area network in response to the bandwidth reservation request.

22. The article of claim 18, further comprising instructions to transmit a first portion of the second media information from the media flow path to the receiver using the first frequency band allocated for the wireless personal area network, and a second portion of the second media information from the media flow path to the receiver using the second frequency band allocated for the wireless local area network.

* * * * *